US011967209B2

United States Patent
(12) United States Patent
Kearns et al.

(10) Patent No.: US 11,967,209 B2
(45) **Date of Patent: *Apr. 23, 2024**

(54) GAMING MACHINE AND METHOD WITH SYMBOL COLLECTION AND ARRAY EXPANSION

(71) Applicant: LNW Gaming, Inc., Las Vegas, NV (US)

(72) Inventors: John K. Kearns, Henderson, NV (US); Mariela Polena, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/735,460

(22) Filed: May 3, 2022

(65) Prior Publication Data

US 2022/0262207 A1 Aug. 18, 2022

Related U.S. Application Data

(63) Continuation of application No. 16/791,739, filed on Feb. 14, 2020, now Pat. No. 11,354,982.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC .. G07F 17/34; G07F 17/3213; G07F 17/3267; G07F 17/3265; G07F 17/3211; G07F 17/326; G07F 17/3269
See application file for complete search history.

(56) References Cited

U.S. PATENT DOCUMENTS 3,733,075 A 5/1973 Burnside et al.
5,342,047 A 8/1994 Heidel et al.
5,356,140 A 10/1994 Dabrowski et al.
5,393,061 A 2/1995 Manship et al.
5,704,835 A 1/1998 Dietz
5,833,537 A 11/1998 Barrie
5,951,397 A 9/1999 Dickinson
6,056,642 A 5/2000 Bennett
(Continued)

FOREIGN PATENT DOCUMENTS

AU 2015210489 A1 2/2016
GB 2097160 A 10/1982
(Continued)

*Primary Examiner* — Justin L Myhr

(57) ABSTRACT

A gaming system includes at least one input device adapted to receive a physical item associated with a monetary value that establishes a credit balance, an input indicative of a wager drawn from the credit balance for a wagering game, and a cashout input that initiates a payout from the credit balance. In response to a wager input, a wagering game is initiated. The gaming system includes an electronic display device adapted to display an active array of symbol positions that are populated by symbols randomly generated from one or more spins of a set of symbol-bearing reels. The active array may be progressively expanded in response to collecting a requisite number of special symbols among the randomly generated symbols at each active array size.

20 Claims, 9 Drawing Sheets

(56) References Cited

U.S. PATENT DOCUMENTS

| | | | | |
|---|---|---|---|---|
| 6,186,894 | B1 * | 2/2001 | Mayeroff ................ | G07F 17/34<br>463/16 |
| 6,641,477 | B1 | 11/2003 | Dietz | |
| 6,910,962 | B2 | 6/2005 | Marks et al. | |
| 7,018,293 | B2 | 3/2006 | Brown et al. | |
| 7,503,847 | B2 | 3/2009 | Baerlocher | |
| 7,553,231 | B2 | 6/2009 | Rodgers et al. | |
| 7,604,538 | B2 | 10/2009 | Pacey | |
| 7,654,895 | B2 | 2/2010 | Pacey | |
| 8,057,295 | B2 | 11/2011 | Vann et al. | |
| 8,083,581 | B2 | 12/2011 | Marks et al. | |
| 8,105,145 | B2 | 1/2012 | Jaffe | |
| 8,105,151 | B2 | 1/2012 | Caputo et al. | |
| 8,192,275 | B2 | 6/2012 | Aoki et al. | |
| 8,287,357 | B2 | 10/2012 | Evans | |
| 8,323,091 | B2 | 12/2012 | Frank et al. | |
| 8,357,041 | B1 | 1/2013 | Saunders | |
| 8,366,538 | B1 | 2/2013 | Saunders et al. | |
| 8,371,930 | B1 | 2/2013 | Saunders et al. | |
| 8,414,380 | B2 | 4/2013 | Saunders et al. | |
| 8,465,358 | B2 | 6/2013 | Kemper | |
| 8,496,522 | B2 | 7/2013 | Caputo et al. | |
| 8,512,138 | B2 | 8/2013 | Saunders | |
| 8,523,659 | B2 | 9/2013 | Evans | |
| 8,574,059 | B2 | 11/2013 | Rodgers et al. | |
| 8,608,545 | B2 | 12/2013 | Arora et al. | |
| 8,662,986 | B2 | 3/2014 | Rodgers et al. | |
| 8,690,660 | B2 | 4/2014 | Saunders et al. | |
| 8,790,169 | B2 | 7/2014 | Saunders | |
| 8,851,974 | B2 | 10/2014 | Caputo et al. | |
| 8,870,642 | B2 | 10/2014 | Leupp et al. | |
| 8,882,578 | B2 | 11/2014 | Saunders | |
| 8,961,291 | B2 | 2/2015 | Dias Pires et al. | |
| 9,005,022 | B2 | 4/2015 | Saunders | |
| 9,165,433 | B2 | 10/2015 | Caputo | |
| 9,230,410 | B2 | 1/2016 | Saunders et al. | |
| 9,245,421 | B2 | 1/2016 | Saunders et al. | |
| 9,251,667 | B2 | 2/2016 | Marks et al. | |
| 9,257,017 | B2 | 2/2016 | Saunders et al. | |
| 9,262,895 | B2 | 2/2016 | Rodgers et al. | |
| 9,275,524 | B2 | 3/2016 | Nicely | |
| 9,299,224 | B2 | 3/2016 | Leupp | |
| 9,311,781 | B2 | 4/2016 | Edwards | |
| 9,349,251 | B2 | 5/2016 | Caputo et al. | |
| 9,355,528 | B2 | 5/2016 | Nicely | |
| 9,483,900 | B2 | 11/2016 | Aoki et al. | |
| 9,870,672 | B2 | 1/2018 | Guerrero | |
| 2004/0038736 | A1 | 2/2004 | Bryant et al. | |
| 2007/0060248 | A1 | 3/2007 | Rodgers et al. | |
| 2007/0060261 | A1 | 3/2007 | Gomez | |
| 2007/0087806 | A1 | 4/2007 | Luciano et al. | |
| 2007/0117607 | A1 | 5/2007 | Olive | |
| 2007/0202943 | A1 | 8/2007 | Thomas | |
| 2007/0232379 | A1 | 10/2007 | Falciglia | |
| 2009/0291741 | A1 | 11/2009 | Schofield | |
| 2009/0325678 | A1 | 12/2009 | Gomez | |
| 2010/0016061 | A1 | 1/2010 | Gomez et al. | |
| 2010/0075737 | A1 | 3/2010 | Bluemel | |
| 2011/0201403 | A1 | 8/2011 | Jaffe et al. | |
| 2013/0065663 | A1 | 3/2013 | Johnson et al. | |
| 2013/0252699 | A1 | 9/2013 | Nauman et al. | |
| 2013/0310149 | A1 | 11/2013 | Meyer | |
| 2016/0042597 | A1 | 2/2016 | Olive | |
| 2017/0301177 | A1 | 10/2017 | Pawloski | |
| 2017/0372558 | A1 | 12/2017 | You et al. | |
| 2018/0033253 | A1 | 2/2018 | Vann et al. | |
| 2018/0268659 | A1 | 9/2018 | Chesworth et al. | |
| 2019/0172305 | A1 | 6/2019 | Maya | |

FOREIGN PATENT DOCUMENTS

| | | |
|---|---|---|
| GB | 2097160 | 5/1984 |
| GB | 2144568 A | 3/1985 |
| GB | 2144568 B | 9/1985 |
| GB | 2251112 A | 6/1992 |

* cited by examiner

GAMING MACHINE AND METHOD WITH SYMBOL COLLECTION AND ARRAY EXPANSION

CROSS-REFERENCE TO RELATED APPLICATIONS

This patent application is a continuation of U.S. patent application Ser. No. 16/791,739, filed on Feb. 14, 2020 and is related to U.S. patent application Ser. No. 17/686,127, filed Mar. 3, 2022, both of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, 2022, SG Gaming, Inc.

FIELD OF THE INVENTION

The present invention relates to a technological improvement to gaming systems, apparatus, and methods by providing a new and improved level of game play that uses new and improved animations and, more particularly, to a feature that triggers expansion of a symbol array in response to a predetermined number of special symbols appearing in the array over the course of a number of symbol generation cycles.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system and a method of operating a gaming system. The gaming system includes at least one input device adapted to receive a physical item associated with a monetary value that establishes a credit balance, an input indicative of a wager drawn from the credit balance for a wagering game, and a cashout input that initiates a payout from the credit balance. In response to a wager input, a wagering game is initiated. The gaming system includes an electronic display device adapted to display an active array of symbol positions that are populated by symbols randomly generated from one or more spins of a set of symbol-bearing reels. The active array may be progressively expanded in response to collecting a requisite number of special symbols among the randomly generated symbols at each active array size. None of the special symbols that appear in the active array of one size are carried over, i.e., held in place, to the active array of another size. An award is provided based on the special symbols and, more particularly, based on the number of expansions of the active array.

Additional aspects of the invention will be apparent to those of ordinary skill in the art in view of the detailed description of various embodiments, which is made with reference to the drawings, a brief description of which is provided below.

Figure 1:
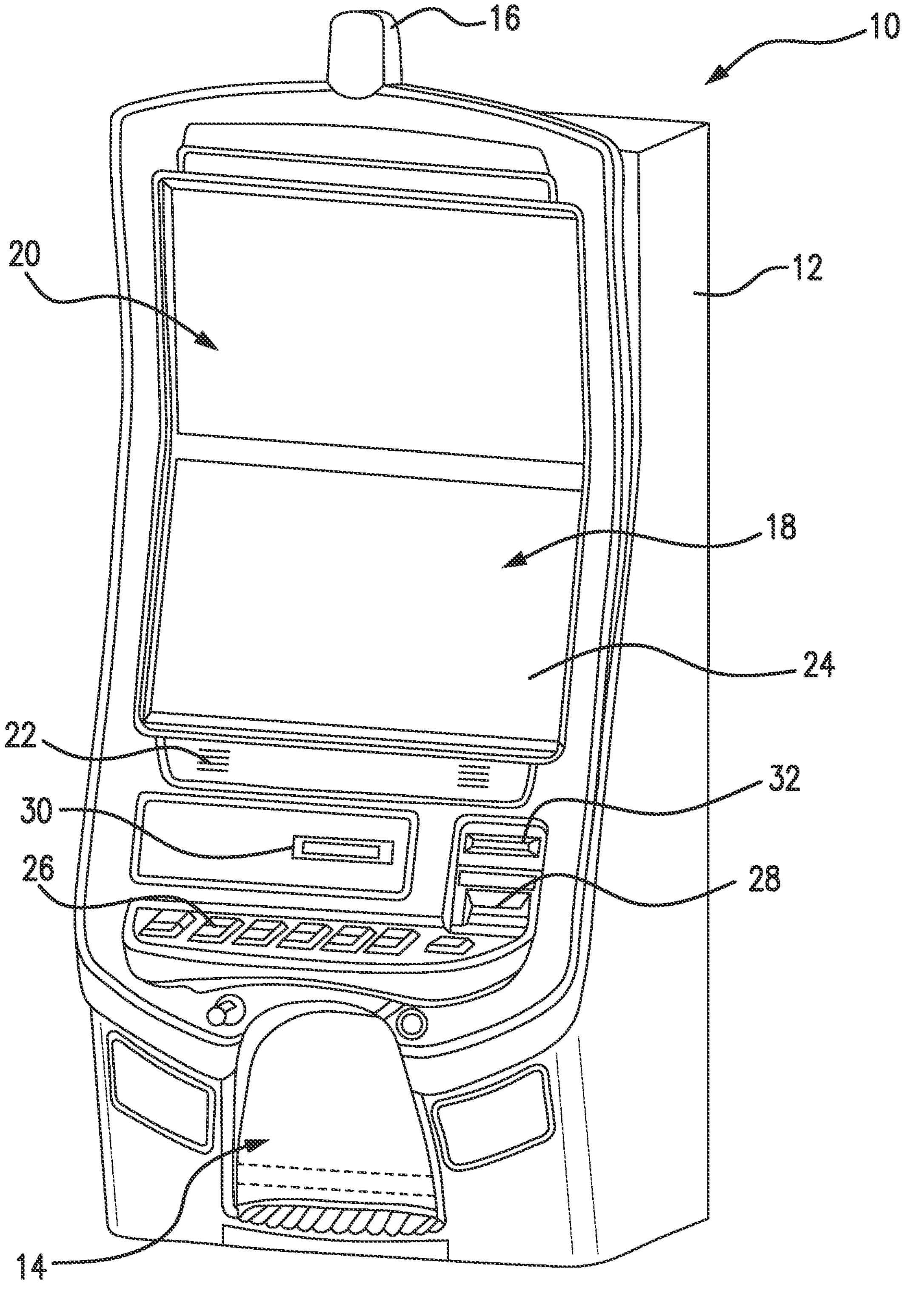
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the “credits” meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the “credits” meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
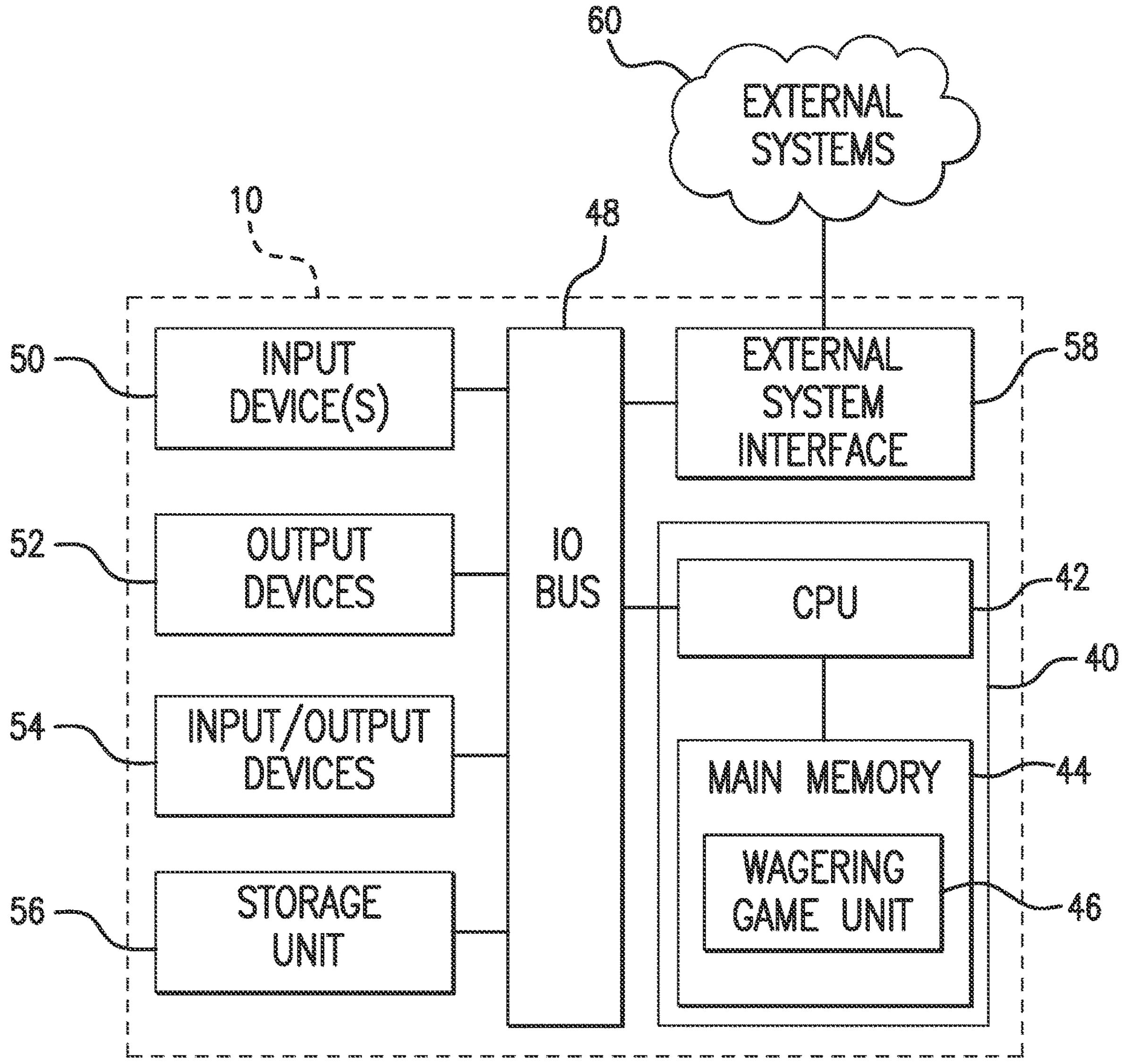
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
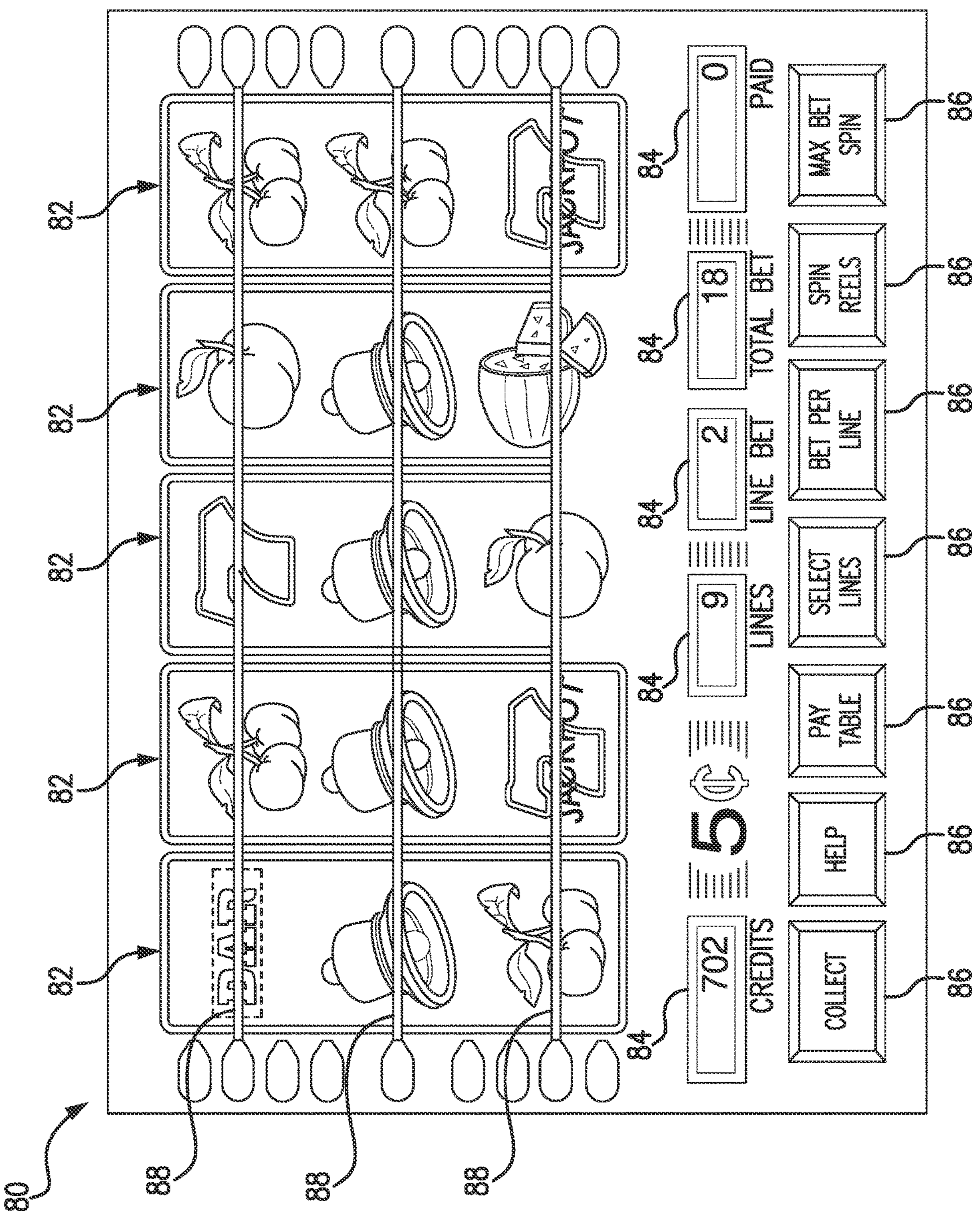
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
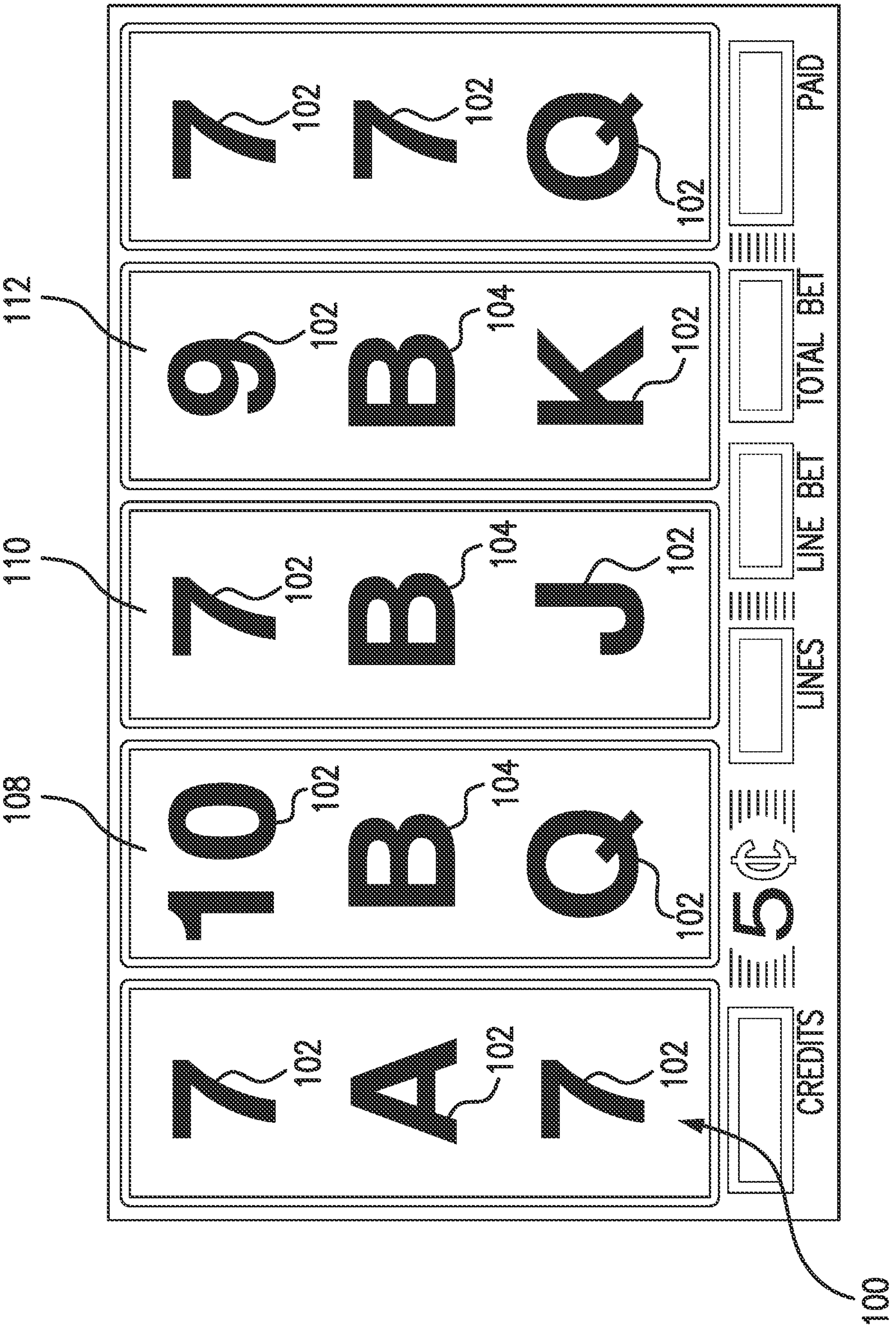
FIG. 4 is an image of an exemplary basic-game screen of a wagering game displayed on a gaming machine showing an outcome causing a bonus-trigger event, according to an embodiment of the present invention.

Referring now to FIG. 4, an image of a basic-game screen adapted to be displayed on the primary display 18 or the secondary display 20 is shown in one embodiment. The basic-game screen shows a symbol-bearing basic-game initial array 100 displaying a set of randomly determined symbols. The displayed symbols include a combination of non-bonus symbols 102 and bonus symbols 104. Alternatively or collectively, the displayed symbols are generated at positions of the initial array 100 by motion of mechanical reels or simulated motion of virtual reels consistent with the game format and theme. In the illustrated embodiment, a set of positions of the initial array 100 (e.g., each column) use the same symbol-bearing reel for displaying symbols. In other embodiments, each symbol of the initial array 100 is displayed using an independent symbol-bearing reel. In one embodiment, a bonus-trigger event occurs in response to the display of a threshold number of bonus symbols, such as three scattered bonus symbols 104 on middle reels 108, 110, and 112 in the initial array 100. That is, the displayed bonus symbols 104 in the initial array 100 is a bonus-trigger event that initiates a bonus game.

In an embodiment described in more detail below, the bonus game awards three free games commencing at bonus level one. During the bonus game, special upgrade symbols borne by bonus reels may land in the bonus array. Collect the required number of upgrade symbols over one or more spins to advance to the next bonus level, expand the bonus array by one additional row, and reset the remaining free spins to three. The number of upgrade symbols collected resets to zero after advancing a bonus level. Additional upgrade symbols collected over the required amount during the current free spin do not carry over to, i.e., count towards, the next bonus level. And none of the upgrade symbols that appear in the bonus array are held or locked in place from one free game to the next. The bonus game ends when no free games remain or bonus level nine is reached. Each bonus level is associated with a respective one of eight progressive jackpots that are funded and incremented by a percentage of wagers placed on the wagering game. When the bonus game ends, the progressive jackpot at the current bonus level is awarded. Only one progressive jackpot is awarded per bonus game. An alternate set of bonus reels is used during each bonus level of the bonus game. Winning symbol combinations for these bonus reels may be identical to the basic game except the bonus symbols may not appear on the bonus reels.

Figure 5A:
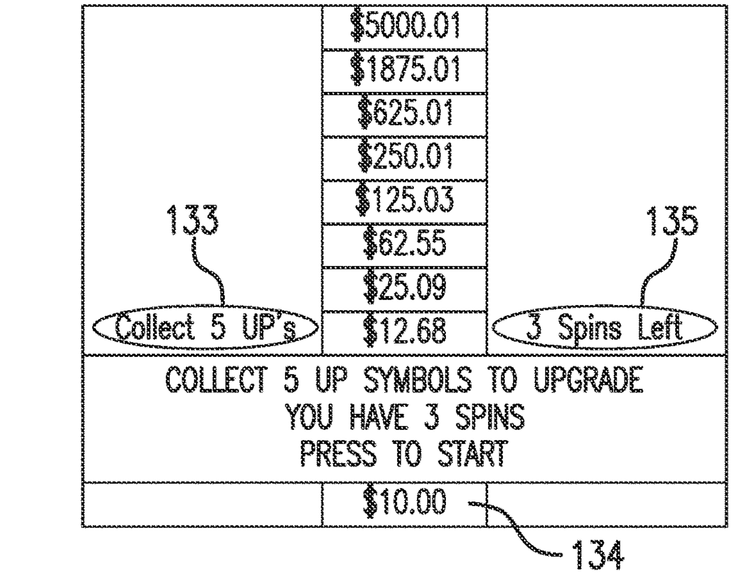
FIGS. 5A-5C, 6A-6D, and 7A-7B are images of an exemplary bonus-game screen of a wagering game displayed on a gaming machine, according to an embodiment of the present invention.
Figure 5B:
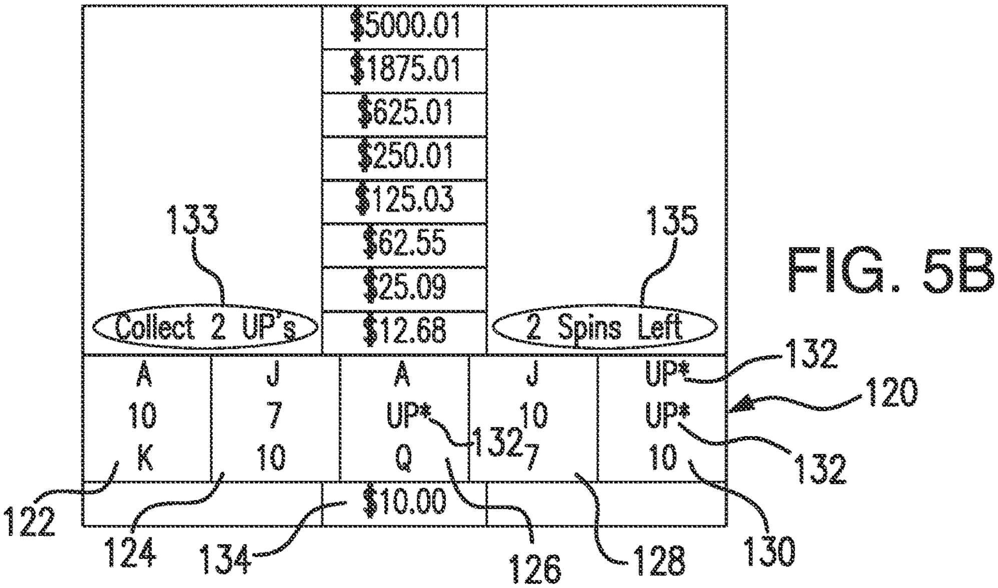
Figure 5C:
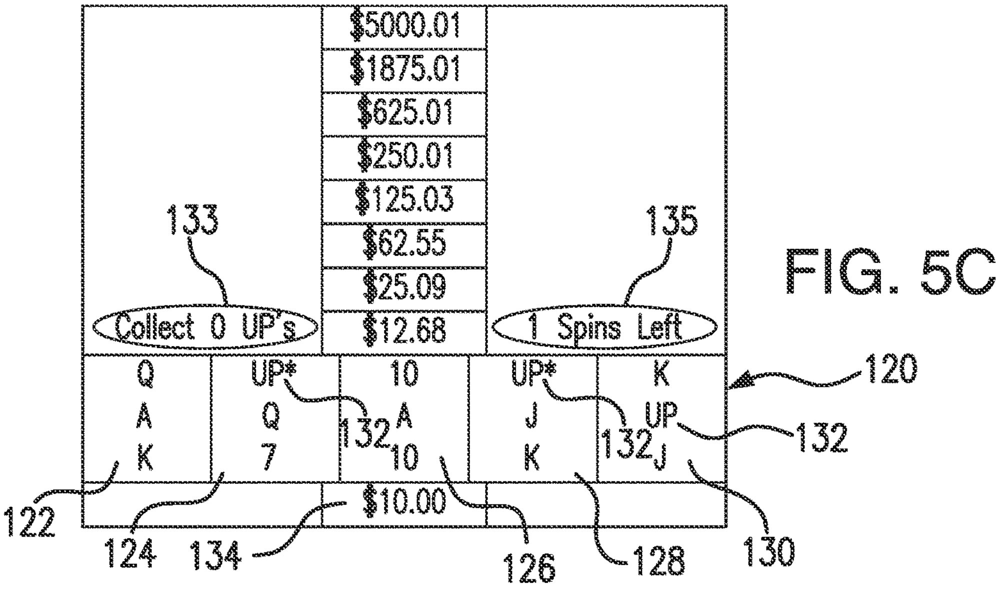

FIGS. 5A-5C, 6A-6D, and 7A-7B illustrate an example of bonus game play under control of the game-logic circuitry. Referring first to FIGS. 5A-5C, there is shown an image of a bonus-game screen adapted to be displayed on the primary display 18 or the secondary display 20. The screen comprises a symbol-bearing active bonus array 120. The symbol positions of the bonus array 120 are arranged in rows and columns, and the columns are associated with respective symbol-bearing bonus reels 122, 124, 126, 128, and 130. Alternatively, each symbol position of the bonus array 120 is associated with a respective symbol-bearing bonus reel. The bonus reels carry a number of different symbols arranged in a particular way and may vary considerably from the number, type, and arrangement of symbols on the basic-game reels. Among the different symbols on the bonus reels are special upgrade symbols 132 illustrated in the figures as "UP" symbols. In each free game of the bonus game, the bonus reels are spun and stopped to randomly place symbols on the stopped reels in visual association with the bonus array 120. Specifically, the stopped bonus reels 122, 124, 126, 128, and 130 depict symbols that populate the respective first, second, third, fourth, and fifth columns of the bonus array 120. In accordance with a pay table, awards are provided for any winning combinations of symbols resulting from each free game.

The bonus game initially awards up to three free games at bonus level one. Bonus level one is associated with a first progressive jackpot 134. The bonus array 120 at bonus level one has three rows and five columns. During the free games at bonus level one, upgrade symbols 132 from the bonus reels may land in the bonus array 120. In response to five upgrade symbols appearing in the bonus array 120 over the course of up to three free games, the bonus game upgrades to bonus level two, expands the bonus array 120 by one additional row to four rows, and resets the remaining free games to three. Additional upgrade symbols collected over the required upgrade amount during the current free game do not carry over to the next bonus level.

FIG. 5A shows an image at bonus level one prior to a first free game, with an upgrade symbol counter 133 initialized at five and a spin counter 135 initialized at three. FIG. 5B shows an image at bonus level one at the conclusion of a first free game, i.e., after the bonus reels have spun and stopped to place symbols, including three upgrade symbols 132, from the stopped bonus reels in the bonus array 120. The upgrade symbol counter 133 has been decremented to two. The upgrade symbols 132 may be successively marked, for example, with an asterisk as the counter 133 is decremented. The spin counter 135 has been decremented to two. FIG. 5C shows an image at bonus level one at the conclusion of a second free game with three upgrade symbols 132 appearing in the bonus array 120. The upgrade symbol counter 133 has been decremented to zero. The spin counter 135 has been decremented to one. The collection of six upgrade symbols 132, i.e., three from the first free game and three from the second free game, exceeds the requisite number of five upgrade symbols, thereby causing the bonus game to upgrade to bonus level two, expand the bonus array 120 to four rows, and reset the remaining free games on the spin counter 135 to three. The additional/sixth upgrade symbol does not carry over to bonus level two.

Referring to FIGS. 6A-6D, the bonus game awards up to three free games at bonus level two. Bonus level two is associated with a second progressive jackpot 136. The bonus array 120 at bonus level two has four rows and five columns. During the free games at bonus level two, upgrade symbols 132 from the bonus reels may land in the bonus array 120. In response to ten upgrade symbols appearing in the bonus array 120 over the course of up to three free games, the bonus game upgrades to bonus level three, expands the bonus array 120 by one additional row to five rows, and resets the remaining free games to three. Additional upgrade symbols collected over the required upgrade amount during the current free game do not carry over to the next bonus level.

Figure 6A:
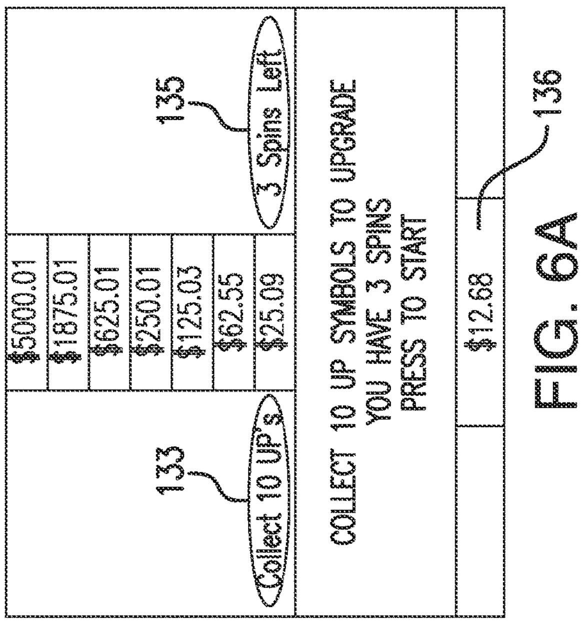
Figure 6B:
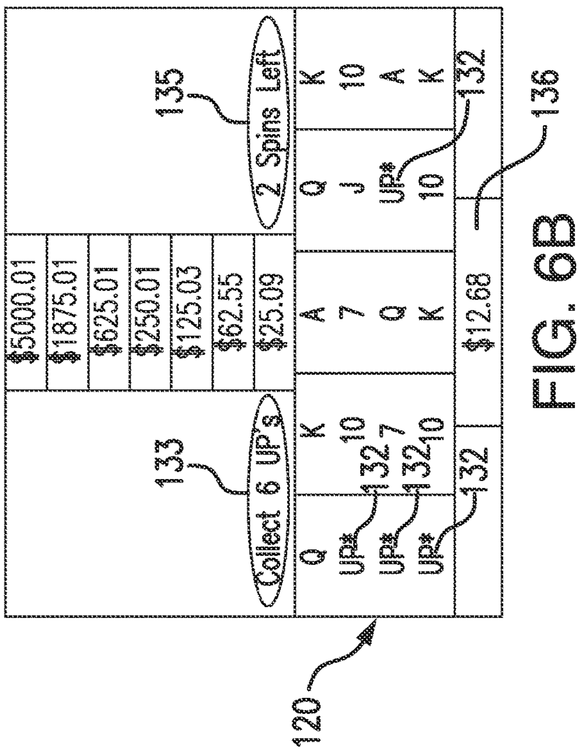
Figure 6C:
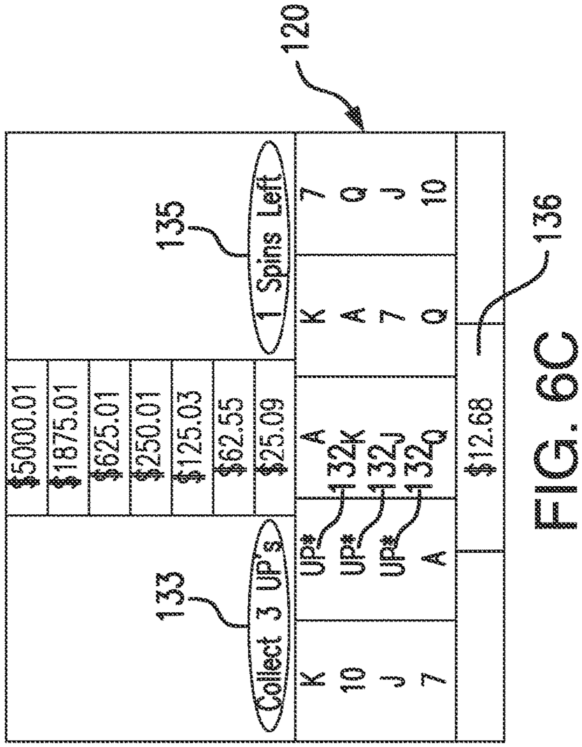
Figure 6D:
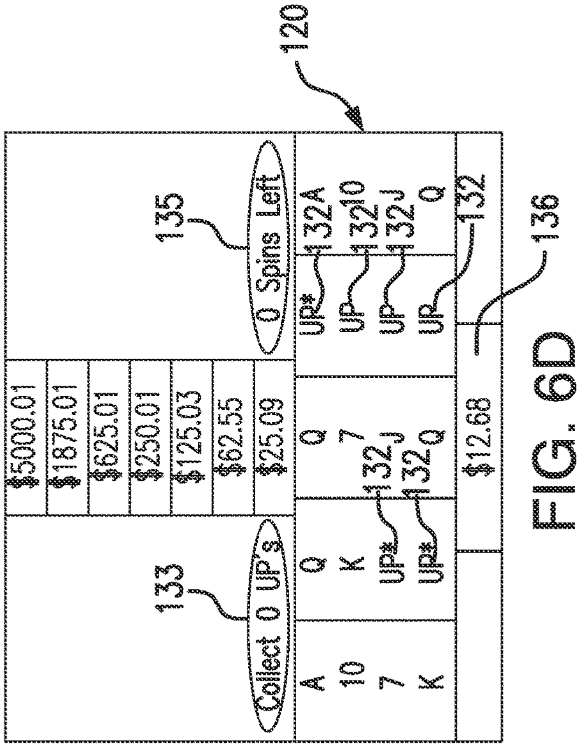

FIG. 6A shows an image at bonus level two prior to a first free game. FIG. 6B shows an image at bonus level two at the conclusion of a first free game with four upgrade symbols 132 appearing in the bonus array. The upgrade symbol counter 133 has been decremented to six. The spin counter 135 has been decremented to two. FIG. 6C shows an image at bonus level two at the conclusion of a second free game with three upgrade symbols 132 appearing in the bonus array 120. The upgrade symbol counter 133 has been decremented to three. The spin counter 135 has been decremented to one. FIG. 6D shows an image at bonus level two at the conclusion of a third free game with six upgrade symbols 132 appearing in the bonus array 120. The upgrade symbol counter 133 has been decremented to zero. The spin counter 135 has been decremented to zero. The collection of thirteen upgrade symbols 132, i.e., three from the first free game, four from the second free game, and six from the third free game, exceeds the requisite number of ten upgrade symbols, thereby causing the bonus game to upgrade to bonus level three, expand the bonus array 120 to five rows, and reset the remaining free games on the spin counter 135 to three. The additional three upgrade symbols beyond the requisite number of ten upgrade symbols do not carry over to bonus level three.

Figure 7A:
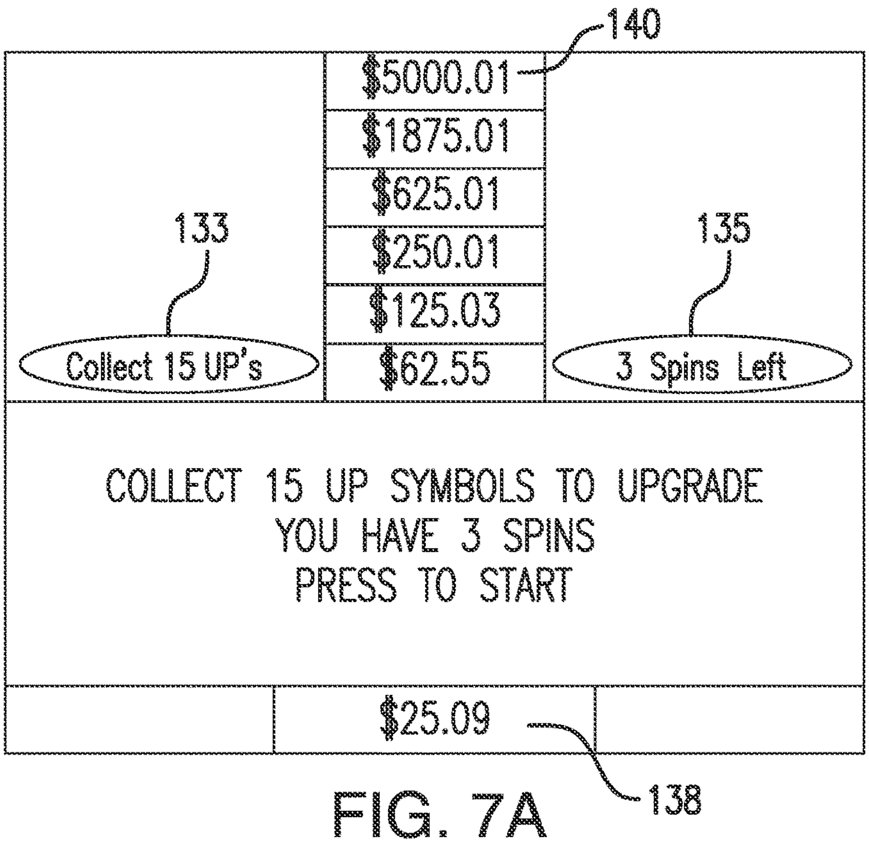
Figure 7B:
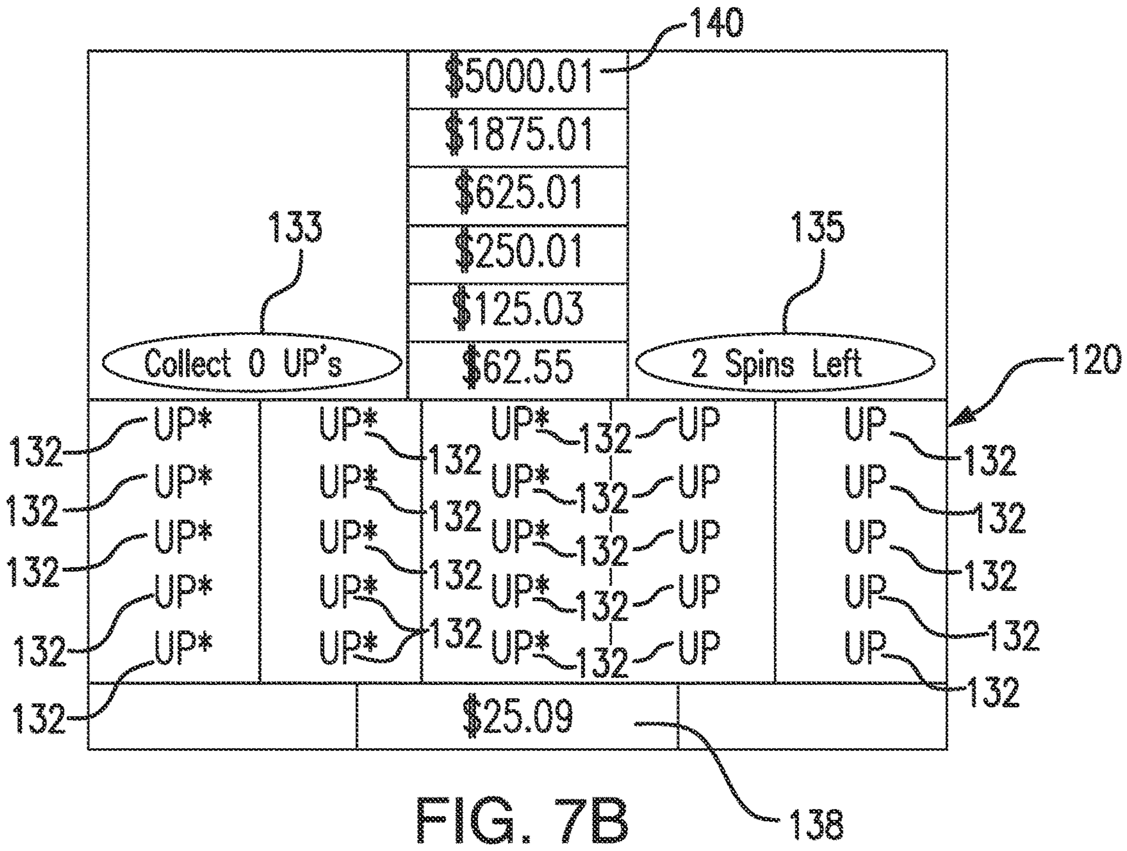

Referring to FIGS. 7A-7B, the bonus game awards up to three free games at bonus level three. Bonus level three is associated with a third progressive jackpot 138. The bonus array 120 at bonus level three has five rows and five columns. During the free games at bonus level three, upgrade symbols 132 from the bonus reels may land in the bonus array 120. In response to fifteen upgrade symbols appearing in the bonus array 120 over the course of up to three free games, the bonus game upgrades to bonus level four, expands the bonus array 120 by one additional row to six rows, and resets the remaining free games to three. Additional upgrade symbols collected over the required upgrade amount during the current free game do not carry over to the next bonus level.

FIG. 7A shows an image at bonus level three prior to a first free game. FIG. 7B shows an image at bonus level three at the conclusion of a first free game with twenty-five upgrade symbols 132 filling the entire bonus array. The upgrade symbol counter 133 has been decremented to zero. The spin counter 135 has been decremented to two. The collection of twenty-five upgrade symbols 132 from the first free game exceeds the requisite number of fifteen upgrade symbols, thereby causing the bonus game to upgrade to bonus level four, expand the bonus array 120 to six rows, and reset the remaining free games on the spin counter 135 to three. The additional ten upgrade symbols beyond the requisite number of fifteen upgrade symbols do not carry over to bonus level four.

The bonus game continues in the above manner until it either reaches the top bonus level, i.e., bonus level nine, or does not generate the requisite number of upgrade symbols at the current bonus level before reaching the top level. If the bonus game reaches the top bonus level, the bonus game ends without any further free games and awards the ninth progressive jackpot 140. If, however, the bonus game does not generate the requisite number of upgrade symbols at the current level before reaching the top level, the bonus game ends at the current level and awards the progressive jackpot associated with the current level. In a preferred embodiment, the bonus game awards only the progressive jackpot associated with the highest bonus level achieved. In an alternative embodiment, the bonus game also awards the progressive jackpots associated with any bonus levels below the highest bonus level achieved.

The bonus game uses new and improved gaming apparatus animations that represent improvements to the underlying technology or technical field of gaming apparatus in the context of the disclosed embodiments of the present invention. For example, the bonus game triggers expansion of the symbol array in response to a predetermined number of upgrade symbols appearing in the symbol array over the course of a number of free games, without carrying over upgrade symbols as the bonus array is expanded or from one free game to the next.

Furthermore, to designate upgrade symbols appearing in the bonus array with animation, each upgrade symbol that lands in the bonus array and counts towards the requisite number may be highlighted, marked (e.g., with an asterisk, star, or check mark), enlarged, brightened, bordered, or distinguished through other animations from its standard appearance. The upgrade symbols are successively designated in the order of the first column from top to bottom, the second column from top to bottom, the third column from top to bottom, the fourth column from top to bottom, and then the fifth column from top to bottom. As each upgrade symbol is designated, the upgrade symbol counter 133 is decremented simultaneously, e.g., in tandem, to clearly indicate progress towards achieving the requisite number of upgrade symbols at the current bonus level. Once the upgrade symbol counter reaches zero, no further upgrade symbols in the bonus array need to be designated.

Moreover, to clearly designate the progressive jackpot at the current bonus level, the progressive jackpot at the current bonus level may be shown below the bonus array while the progressive jackpots at all bonus levels above the current level are shown above the bonus array. To illustrate an upgrade from a current bonus level to the next bonus level, the progressive jackpot at the current bonus level may "drop off" the lower end of the bonus-game screen, and the progressive jackpot at the next bonus level may shift downward from above the bonus array to below the bonus array, replacing the progressive jackpot that dropped off the screen. The bonus array may then expand or grow vertically by one additional row to fill the space that was occupied by the down-shifted progressive jackpot.

The table below provides an example of the number of bonus levels; the size of the bonus array 120 in terms of number of rows M by number columns N at each bonus level; the requisite number of upgrade symbols 132 that must be collected at each bonus level to advance to the next level; the allotted number of free games at each level to collect the requisite number of upgrade symbols 132; and the minimum value, i.e., reset value, of the progressive jackpot at each level prior to any incrementation.

| Bonus Level | M × N Bonus Array | Requisite Number of Upgrade Symbols to Advance to Next Level | Maximum Number of Free Games to Collect Upgrade Symbols | Minimum Progressive Jackpot Value |
|---|---|---|---|---|
| 1 | 3 × 5 | 5 | 3 | $10.00 |
| 2 | 4 × 5 | 10 | 3 | $12.50 |
| 3 | 5 × 5 | 15 | 3 | $25.00 |
| 4 | 6 × 5 | 20 | 3 | $62.50 |
| 5 | 7 × 5 | 30 | 3 | $125.00 |
| 6 | 8 × 5 | 40 | 3 | $250.00 |
| 7 | 9 × 5 | 55 | 3 | $625.00 |
| 8 | 10 × 5 | 70 | 3 | $1875.00 |
| 9 | NA | NA | NA | $5000.00 |

In alternative embodiments, the number of available bonus levels may vary to be greater than nine bonus levels or as few as two bonus levels.

The displayed bonus array 120 at a given bonus level may be larger than an active portion used at that bonus level to display an outcome of a free game, i.e., winning combinations and collected upgrade symbols. For example, although the active bonus array at bonus level one may be a 3×5 array, the seven rows applicable to respective bonus levels two through eight, as well as symbols that populate those rows in a free game outcome, may be dimly shown on the bonus-game screen above the 3×5 array even though those rows and associated symbols are not part of the free game outcome.

Instead of expanding the bonus array 120 vertically to include an additional row or rows with each upgrade, the bonus array 120 may expand vertically to include an additional column or columns with each upgrade, an additional row(s) and/or column(s) with each upgrade, or an additional partial row(s) and/or column(s) with each upgrade. The type of expansion may be randomly selected.

The requisite number of upgrade symbols 132 to advance from the current bonus level to the next bonus level may vary from those shown in the table. Although the requisite number is determined either before commencing the bonus game or before commencing the current bonus level, the requisite number may be randomly determined.

The allotted number of free games at each bonus level may be more or less than three and may vary from one bonus level to the next. And if the requisite number of upgrade symbols 132 to advance from the current bonus level to the next bonus level is achieved in less than the allotted number of free games in the current bonus level, any leftover/unused free games may be carried over to the next bonus level. For example, if a requisite number of five upgrade symbols is achieved in one free game but the allotted number of free games at the current bonus level is three, the two leftover free games may be carried over and added to the allotted number of free games at the next bonus level.

Instead of associating a progressive jackpot value with each bonus level, each bonus level may be associated with a fixed jackpot value that does not increment as wagers are placed on the wagering game. Alternatively or in addition, each upgrade symbol 132 that lands in the bonus array 120 may bear or be associated with a respective credit value. The credit values associated with the upgrade symbols 132 may generally increase in value from one bonus level to the next. The bonus game may award the credit values associated with all collected upgrade symbols 132 at the highest bonus level achieved. In an alternative embodiment, the bonus game also awards the credit values associated with all collected upgrade symbols 132 at any bonus levels below the highest level achieved. Thus, the bonus game provides an award based on the upgrade symbols 132, whether the award be a progressive or fixed jackpot value associated with the bonus level achieved by collecting upgrade symbols 132 or the award be credit values directly associated with the collected upgrade symbols 132.

Figure 8A:
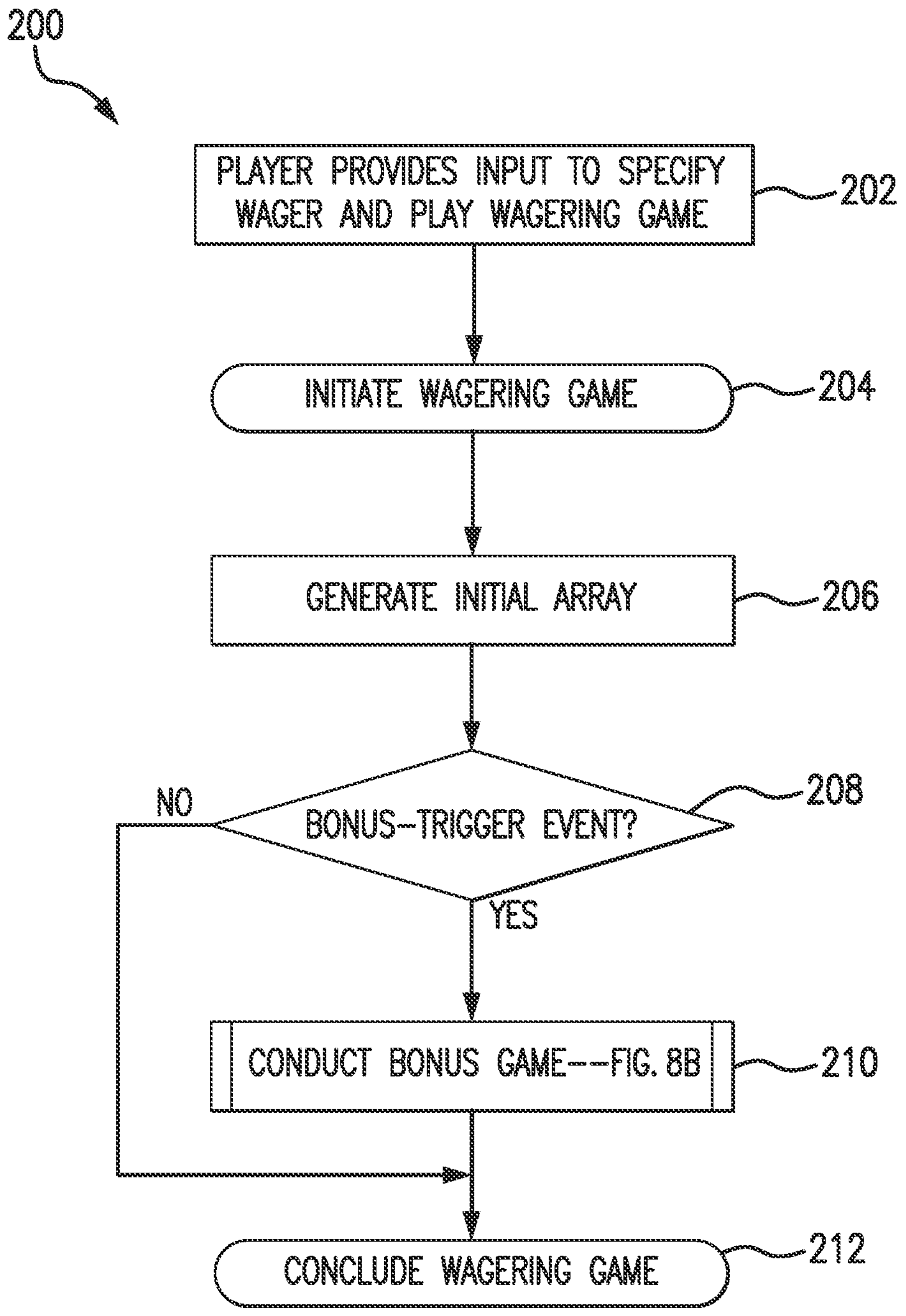
FIGS. 8A-8B are flowcharts for an algorithm that corresponds to instructions executed by a controller in accord with at least some aspects of the disclosed concepts.

Referring now to FIG. 8A, a flowchart, described by way of example above, represents one data processing method 200 corresponding to at least some instructions stored and executed by the game-logic circuitry 40 in FIG. 2 to perform the above described functions associated with the disclosed concepts. The method 200 further incorporates a data processing method 300 detailed in FIG. 8B that describes one way a bonus game may be conducted during the operation of the wagering game in response to a bonus-trigger event.

In step 202, the game-logic circuitry 40 receives player input via one or more input devices that indicates a wager amount drawn from a credit balance and an intention to initiate an instance of the wagering game. Examples of input include pressing a "MAX BET" or "SPIN REELS" button on a wagering machine, or interfacing with the wagering game system in another way, e.g., using a mobile device or hand gesture to control the wagering machine.

In step 204, in response to the input provided by the player and interpreted by the wagering game machine and system, the wagering game is initiated as the formal process for conducting the wagering game is started. In one embodiment, credits are deducted from a credit meter to fund the gaming instance in accordance with the player input indicating a wager drawn from a credit balance associated with the player.

In step 206, the basic-game initial array is initialized and symbols are randomly determined using a set of basic-game reels to generate a corresponding basic-game initial array outcome. That is, one or more electronic display devices are directed to display symbols representing at least a part of an outcome of the wagering game in the initial array. As discussed prior, the initial array may comprise any type of configuration, reels composition, and associated criteria for bonus-trigger events, feature-trigger events, and award-trigger events. The specifics of the basic-game and initial array may be greatly varied between embodiments.

In step 208, there is a determination as to whether a bonus-trigger event is included in the initial array outcome. In one embodiment, a set of bonus symbols displayed in the initial array is a bonus-trigger event initiating a bonus game. In other embodiments, the bonus-trigger event is a mystery trigger.

In step 210, in response to a bonus-trigger event, a bonus game is performed. In one embodiment, the bonus game is initiated on a bonus array of symbol-bearing bonus reels that include special upgrade symbols. One specific embodiment for conducting a bonus game is described in detail in FIG. 8B below. During the bonus game, an award-trigger event may occur resulting in a corresponding amount awarded to the player. Award-trigger events may result in awarding a credit value in one or more currencies, free wagering game instances, progressive jackpot awards, non-credit related prizes, etc.

In step 212, after the bonus game is completed (or in the event that no bonus-trigger event was present in the initial array), the wagering game instance is formally concluded.

Figure 8B:
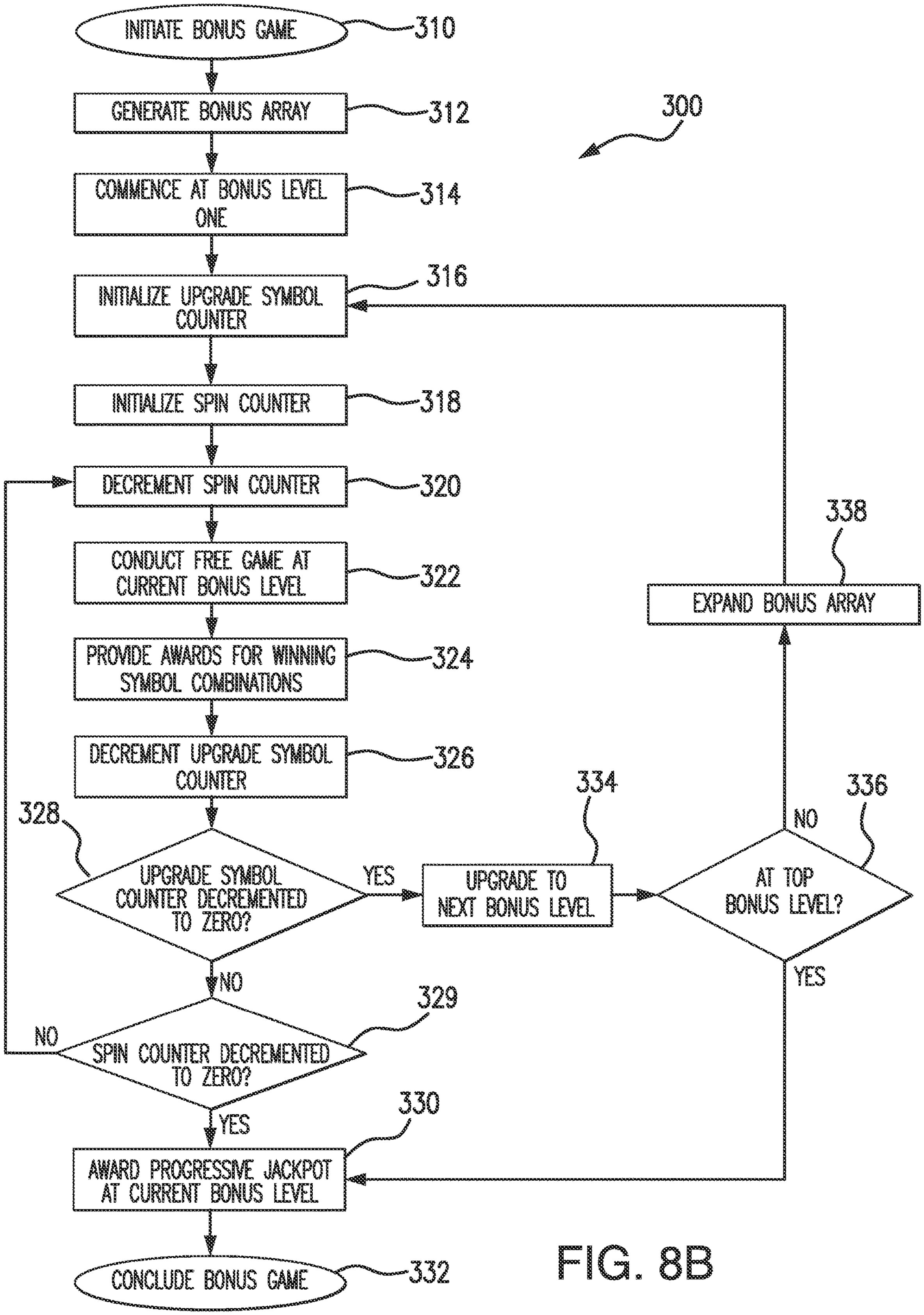

Referring now to FIG. 8B, one embodiment for a data processing method 300 is represented corresponding to at least some instructions stored and executed by the game-logic circuitry 40 in FIG. 2 to perform the above described functions. The data processing method 300 describes performing a bonus game conducted during the operation of the wagering game described in FIG. 8A in one embodiment.

In step 310, the bonus game is initiated in response to a bonus-trigger event in the initial array, in one embodiment. As detailed prior, the bonus game may be initiated by a bonus-trigger event that includes one or more bonus symbols displayed as part of a basic-game initial array outcome or as a result of a mystery trigger (e.g., RNG selection).

In step 312, the bonus game generates a bonus array comprising a set of array positions where a set of symbol-bearing bonus reels are used in conjunction with one or more random numbers to conduct a plurality of free games and visually display symbols in the array positions.

In step 314, the bonus game commences at bonus level one.

In step 316, the bonus game initializes an upgrade symbol counter to an initial value, such as five, associated with the current bonus level. The upgrade symbol counter (e.g., upgrade symbol counter 133) is displayed on the graphical user interface.

In step 318, the bonus game initializes a spin counter to an initial value such as three. The spin counter (e.g., spin counter 135) is displayed on the graphical user interface.

In step 320, the bonus game decrements the spin counter (e.g., spin counter 135) by one prior to initiating and conducting a free game.

In step 322, the bonus game conducts a free game at the current bonus level by spinning and stopping the bonus reels to randomly populate the bonus array with symbols. The symbols may include standard symbols (including "blank" symbols) and special upgrade symbols.

In step 324, in accordance with a pay table, the bonus game provides awards for any winning combinations of symbols resulting from the free game. The awards may, for example, include line pays and scatter pays.

In step 326, the bonus game decrements the upgrade symbol counter (e.g., upgrade symbol counter 133) by one for each upgrade symbol appearing in the bonus array.

In step 328, the bonus game determines whether or not the upgrade symbol counter decremented to zero in prior step 326.

If the upgrade symbol counter did not decrement to zero, in step 329 the bonus game determines whether or not the spin counter decremented to zero in prior step 320. If the spin counter decremented to zero, the bonus game awards the progressive jackpot at the current bonus level in step 330 and concludes in step 332. If the spin counter did not decrement to zero, the process flow of the bonus game returns to step 320.

If the upgrade symbol counter decremented to zero, the bonus game upgrades to the next bonus level in step 334 and determines whether or not that next bonus level is the top bonus level (e.g., bonus level nine) in step 336. If that next bonus level is the top bonus level, the bonus game awards the progressive jackpot at that top bonus level in step 330 and concludes in step 332. If that next bonus level is not the top bonus level, the bonus game expands the bonus array by one additional row in step 338 and returns its process flow to step 316.

When the bonus game concludes, the process flow returns to the parent wagering game process that called the bonus game so that the wagering game can continue or formally conclude.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a gaming machine primarily dedicated to playing at least one casino wagering game, the gaming machine including an electronic display device and one or more electronic input devices, the electronic display device configured to display an active array of symbol positions for a first game level; and game-logic circuitry configured to perform the operations of:

detecting, via at least one of the one or more electronic input devices, a physical item associated with a monetary value that establishes a credit balance;

initiating the casino wagering game in response to an input indicative of a wager drawn from the credit balance;

spinning and stopping symbol-bearing reels through one or more spins to place special symbols borne by the stopped reels in the active array;

in response to a first predetermined number of the special symbols appearing in the active array over the one or more spins, progressing from the first game level to a second game level by displaying, via the electronic display device, animation of expansion of the active array to include additional symbol positions and repeating the spinning and stopping operation with the expanded active array for one or more additional spins;

providing an award based on the special symbols and current game level, wherein the provided award is a first jackpot value associated with the first game level and the provided award is a second jackpot value associated with the second game level, and wherein the first jackpot value is not an available award after progressing to the second game level; and receiving, via at least one of the one or more electronic input devices, a cashout input that initiates a payout from the credit balance.

2. The gaming system of claim 1, wherein the game-logic circuitry is configured to, in response to a second predetermined number of special symbols appearing in the expanded active array over the one or more additional spins, progress from the second game level to a third game level associated with a further expanded active array and a third jackpot value, the further expanded active array including the expanded active array and one or more further additional symbol positions.

3. The gaming system of claim 2, wherein the first predetermined number is different from the second predetermined number.

4. The gaming system of claim 1, wherein none of the special symbols that appear in the active array are carried over to the expanded active array.

5. The gaming system of claim 1, wherein the one or more spins is a first predetermined plurality of spins and the one or more additional spins is a second predetermined plurality of spins.

6. The gaming system of claim 5, wherein the number of spins within the first predetermined plurality of spins is different from the number of spins within the second predetermined plurality of spins.

7. The gaming system of claim 1, wherein none of the special symbols that appear in the active array are held in place from one spin to the next.

8. The gaming system of claim 1, wherein the expanding operation includes adding a row to the active array.

9. A method of operating a gaming machine of a gaming system, the gaming machine primarily dedicated to playing at least one casino wagering game, the gaming machine including an electronic display device and one or more electronic input devices, the electronic display device configured to display an active array of symbol positions for a first game level, the method comprising:

detecting, via at least one of the one or more electronic input devices, a physical item associated with a monetary value that establishes a credit balance;

initiating, by game-logic circuitry of the gaming system, the casino wagering game in response to an input indicative of a wager drawn from the credit balance;

spinning and stopping symbol-bearing reels through one or more spins to place special symbols borne by the stopped reels in the active array;

in response to a first predetermined number of the special symbols appearing in the active array over the one or more spins, progressing, by the game-logic circuitry, from the first game level to a second game level by animating, via the electronic display device, expansion of the active array to include additional symbol positions and repeating the spinning and stopping operation with the expanded active array for one or more additional spins;

providing, by the game-logic circuitry via the electronic display device, an award based on the special symbols and current game level, wherein the provided award is a first jackpot value associated with the first game level and the provided award is a second jackpot value associated with the second game level, and wherein the first jackpot value is not an available award after progressing to the second game level; and receiving, via at least one of the one or more electronic input devices, a cashout input that initiates a payout from the credit balance.

10. The method of claim 9 further comprising, by the game-logic circuitry in response to a second predetermined number of special symbols appearing in the expanded active array over the one or more additional spins, progress from the second game level to a third game level associated with a further expanded active array and a third jackpot value, the further expanded active array including the expanded active array and one or more further additional symbol positions.

11. The method of claim 10, wherein the first predetermined number is different from the second predetermined number.

12. The method of claim 9, wherein none of the special symbols that appear in the active array are carried over to the expanded active array.

13. The method of claim 9, wherein the one or more spins is a first predetermined plurality of spins and the one or more additional spins is a second predetermined plurality of spins.

14. The method of claim 13, wherein the number of spins within the first predetermined plurality of spins is different from the number of spins within the second predetermined plurality of spins.

15. The method of claim 9, wherein none of the special symbols that appear in the active array are held in place from one spin to the next.

16. The method of claim 9, wherein the expanding operation includes adding a row to the active array.

17. A gaming machine primarily dedicated to playing at least one casino wagering game, the gaming machine comprising:

an electronic display device configured to display an active array of symbol positions for a first game level;

one or more electronic input devices; and game-logic circuitry configured to perform the operations of:

detecting, via at least one of the one or more electronic input devices, a physical item associated with a monetary value that establishes a credit balance;

initiating the casino wagering game in response to an input indicative of a wager drawn from the credit balance;

spinning and stopping symbol-bearing reels through one or more spins to place special symbols borne by the stopped reels in the active array;

in response to a first predetermined number of the special symbols appearing in the active array over the one or more spins, progressing from the first game level to a second game level by displaying, via the electronic display device, animation of expansion of the active array to include additional symbol positions and repeating the spinning and stopping operation with the expanded active array for one or more additional spins;

providing an award based on the special symbols and current game level, wherein the provided award is a first jackpot value associated with the first game level and the provided award is a second jackpot value associated with the second game level, and wherein the first jackpot value is not an available award after progressing to the second game level; and receiving, via at least one of the one or more electronic input devices, a cashout input that initiates a payout from the credit balance.

18. The gaming machine of claim 17, wherein the game-logic circuitry is configured to, in response to a second predetermined number of special symbols appearing in the expanded active array over the one or more additional spins, progress from the second game level to a third game level associated with a further expanded active array and a third jackpot value, the further expanded active array including the expanded active array and one or more further additional symbol positions.

19. The gaming machine of claim 17, wherein none of the special symbols that appear in the active array are carried over to the expanded active array.

20. The gaming machine of claim 17, wherein the one or more spins is a first predetermined plurality of spins and the one or more additional spins is a second predetermined plurality of spins, and wherein the number of spins within the first predetermined plurality of spins is different from the number of spins within the second predetermined plurality of spins.

* * * * *